United States Patent [19]
Albesa

[11] Patent Number: 5,982,876
[45] Date of Patent: Nov. 9, 1999

[54] METHOD OF FINDING AN ENTRY IN A COLLECTION OF DATA, AND ELECTRONIC DEVICE IN WHICH SUCH A METHOD IS IMPLEMENTED

[75] Inventor: Franck Albesa, Le Mans, France

[73] Assignee: U.S. Philips Corporation, New York, N.Y.

[21] Appl. No.: 08/931,398

[22] Filed: Sep. 16, 1997

[30] Foreign Application Priority Data

Sep. 18, 1996 [FR] France .................................. 96 11384

[51] Int. Cl.⁶ .............................. H04M 1/00; H04M 9/00
[52] U.S. Cl. .......................... 379/354; 379/433; 379/428; 455/90; 455/556
[58] Field of Search ..................................... 379/428, 433, 379/355, 356, 142, 354, 93.17, 93.23, 368; 455/415; 707/530, 531, 533, 540

[56] References Cited

U.S. PATENT DOCUMENTS

| | | | |
|---|---|---|---|
| 5,218,536 | 6/1993 | McWherter | 364/419 |
| 5,333,317 | 7/1994 | Dann | 395/600 |
| 5,436,954 | 7/1995 | Nishiyama et al. | 379/420 |
| 5,592,546 | 1/1997 | Takahashi | 379/355 |
| 5,677,949 | 10/1997 | Macor | 379/355 |
| 5,724,597 | 3/1998 | Cuthbertson et al. | 395/793 |

OTHER PUBLICATIONS

Alan Simpson, "Mastering WordPerfect for Windows" pp. 340–383, 1992.

*Primary Examiner*—Curtis A. Kuntz
*Assistant Examiner*—Rexford N. Barnie
*Attorney, Agent, or Firm*—Dicran Halajian

[57] ABSTRACT

A device and method for finding a desired entry in a collection of data is disclosed where the data collection is searched for first entries beginning with a selected character. After displaying the search results, an unwanted character of an entry included in the first entries is changed to a desired character, and the data collection is searched for second entries beginning with the desired character. Next, a portion of the first entries is replaced with the second entries, where this portion begins from the unwanted character. This process is repeated until the desired entry is displayed.

8 Claims, 1 Drawing Sheet

METHOD OF FINDING AN ENTRY IN A COLLECTION OF DATA, AND ELECTRONIC DEVICE IN WHICH SUCH A METHOD IS IMPLEMENTED

FIELD OF THE INVENTION

The invention relates to a method of finding an entry in a collection of data which can be consulted from an electronic device which comprises data selection means and display means, said method in particular comprising:
- the implementation of a search in said collection after a character has been selected,
- displaying an entry of the collection starting with the selected character or with the chain of characters ending with the selected character, if such an entry exists,
- displacing a selection cursor in the displayed entry.

The invention also relates to an electronic device, in particular a telephone set, comprising selection means, display means, and means for consulting a collection of data, which consulting means in particular comprise:
- means for carrying out a search in said collection after a character has been selected,
- means for displaying an entry of the collection starting with the selected character or with the chain of characters ending with the selected character, if such an entry exists,
- means for displacing a selection cursor in the displayed entry.

The invention is used in particular in portable electronic equipment.

In fact, the present trend is to miniaturize electronic devices as much as possible, especially portable devices, so that in many cases these will have keyboards of small size on which the number of keys is reduced. It is thus current practice to regroup several characters under one and the same key. This is the case, for example, in telephone devices where the letters A, B and C are combined under key 2, the letters D, E and F under key 3, etc. In that case the $i^{th}$ letter is obtained by pressing the relevant key i times in quick succession. The operation of accessing a group of characters is thus rendered particularly inconvenient.

A method of searching for an entry in a collection of data which renders it possible to reduce the number of keyboard operations necessary for accessing said entry is described in particular in an international patent application under no. WO96/27947. The method consists in that the entry closest to the selected chain of characters is sought in the collection of data, and in that this entry is displayed. The cursor is subsequently displaced to the next position if the last character selected is identical to the character which occupies the same position in the displayed entry.

SUMMARY OF THE INVENTION

The invention has for its object to provide a method which renders it possible to simplify such a search by reducing still further the number of keyboard operations to be carried out.

To achieve this, a method according to the invention as described in the opening paragraph is characterized in that said cursor is placed on the first character of the displayed entry (called distinguishing character) which renders it possible to distinguish it from other entries of the collection.

Similarly, an electronic device according to the invention as defined in the introductory paragraph is characterized in that said means for displacing the selection cursor render it possible to place the cursor on the first character of the displayed entry (called distinguishing character) which renders it possible to distinguish it from other entries of the collection.

It thus suffices for the user to select the character corresponding to this distinguishing character in the string which is searched for. The search is then restarted on the basis of this modification as provided, and this continues until the desired combination has been found. The number of selection operations is thus significantly reduced for the user.

BRIEF DESCRIPTION OF THE DRAWINGS

The invention will be more clearly understood and further details will become apparent from the following description given with reference to the annexed drawings which are given by way of example, to which the invention is by no means limited, where.

DETAILED DESCRIPTION OF THE INVENTION

The electronic device described below by way of example is a telephone device, and the search procedure described is the procedure of searching for a name in a telephone directory. The use of the invention is in fact particularly advantageous in this application. However, the invention is by no means limited to this type of device.

Figure 1:
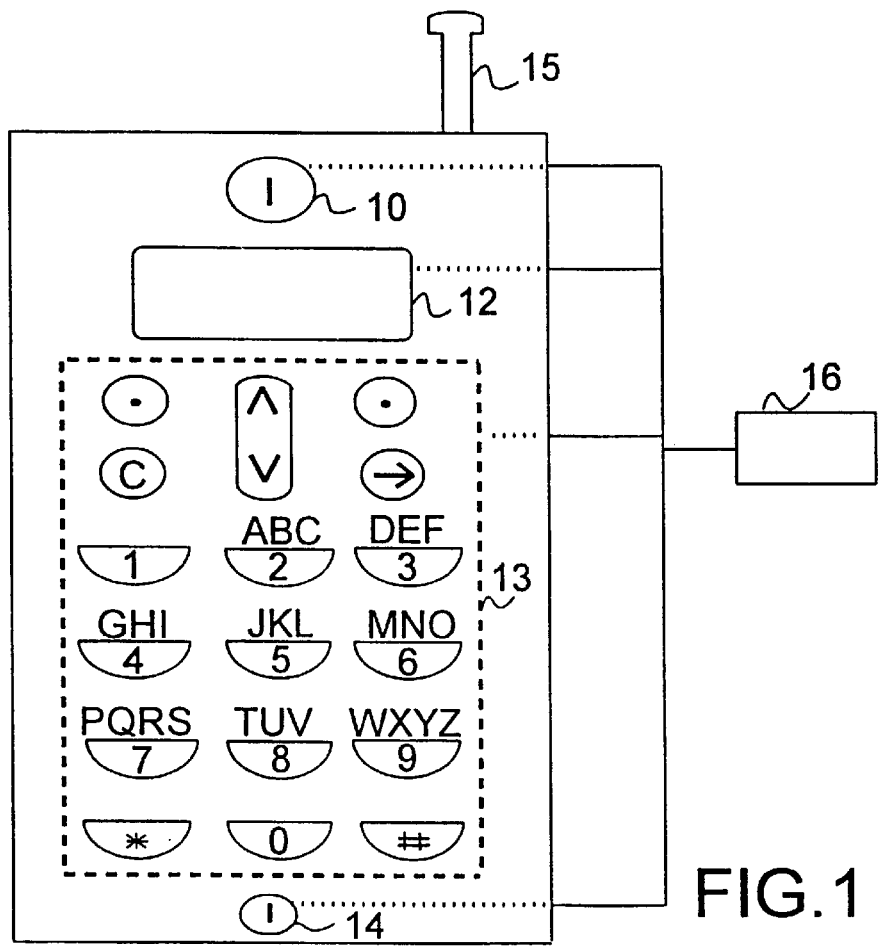
FIG. 1 diagrammatically shows an example of an electronic device according to the invention.

The electronic device shown in FIG. 1 is a mobile telephone. It comprises a loudspeaker earphone 10, a screen 12, a keyboard 13, a microphone 14, and an antenna 15. The keyboard 13 comprises on the one hand keys which render it possible to move in a menu, in particular a key inscribed "C" which corresponds to the delete function, and a key inscribed "→" which corresponds to the selection function, and on the other hand the twelve conventional keys of a telephone keyboard: the keys 0 to 9, the key *, and the key #. In conventional manner, the key 1 has been given the "space" function, the key 2 the letters A, B and C, the key 3 the letters D, E and F, the key 4 the letters G, H and I, the key 5 the letters J, K and L, the key 6 the letters M, N and O, the key 7 the letters P, Q, R and S, the key 8 the letters T, U and V, and the key 9 the letters W, X, Y, and Z. This telephone in addition comprises a microprocessor arrangement 16 which enables its operation and which in particular enables the implementation of a method according to the invention. For an analog cellular telephone conforming to the ETACS or AMPS standard, for example, this microprocessor arrangement is advantageously formed on the basis of a 8051 unit manufactured by Philips Semiconductors.

The process of achieving access according to the invention will first be described with reference to an example. A list will be considered for this purpose with the following contents:

List
  Mariette
  Marie Alice
  Marie Anne
  Marie Antoinette and it is assumed that the user is trying to find the name "Marie Antoinette".

According to the invention, he presses the key 6 once: the letter "M" appears on the screen, and a first search is started. The first entry of the list corresponding to the selected letter is displayed. This is the succession of characters "Mariette". The cursor is placed on the first character of this entry (called distinguishing character hereinafter) which renders it possible to distinguish it from other entries of the list, i.e. on the letter "t" here. The user is then capable of modifying the displayed entry by selecting the next relevant character in the string searched by him, i.e. a space (which means pressing the key 1 once). The string "Marie Alice", which is the first entry in the list corresponding to the string "Marie__", is then displayed, and the cursor is placed on the letter "1". The user now selects the character "n" by pressing the key 6 twice. Now the string "Marie Anne" is shown on the screen, with the cursor placed on the letter "n". The user finally selects the letter "t" by pressing key 8 once. The desired entry "Marie Antoinette" now appears on the screen.

The selection operation and the indications shown on the screen during this searching method are summarized in the Table below:

| Selection | Display |
|---|---|
| M (press key 6 once) | M |
|  | Mariette |
| _ (press key 1 once) | Marie_ |
|  | Marie Alice |
| n (press key 6 twice) | Marie An |
|  | Marie Anne |
| t (press key 8 once) | Marie Ant |
|  | Marie Antoinette |

Thus five key operations were necessary for displaying the desired name. For comparison, it would have required 15 key operations for the user to arrive at the entire string of characters "Marie Ant" necessary for finding the name Marie Antoinette (1 for M, 1 for a, 3 for r, 3 for i, 2 for e, 1 for the space, 1 for A, 2 for n, and 1 for t).

Figure 2:
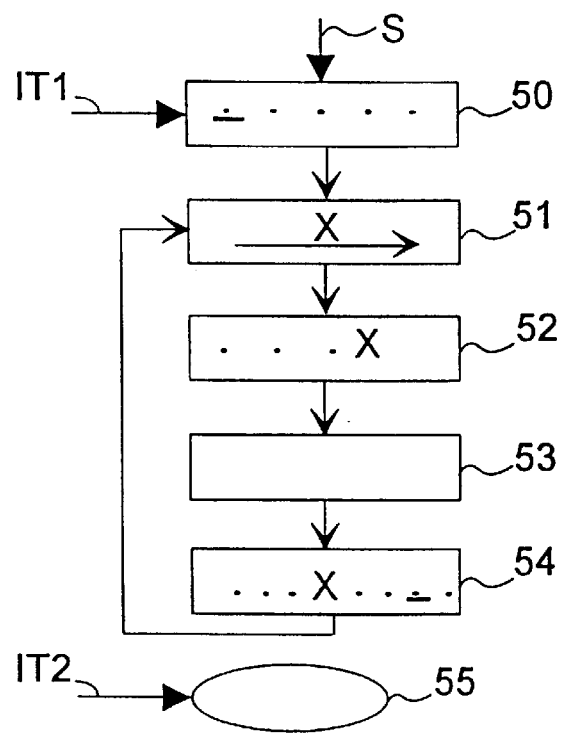
FIG. 2 is a flowchart representing the implementation of a method according to the invention.

An example of a searching method according to the invention will now be described with reference to the flowchart of FIG. 2.

The method according to the invention is triggered when the user selects the option "search list" in the telephone menu. This selection is represented by the arrow S in FIG. 2. In box 50, the cursor is shown on the screen so as to indicate to the user that he must select the first character of the string searched for. In box 51, the method is waiting for the selection of a character by the user: when the user presses a key, a counter of one second is triggered. As long as this counter has not yet completed its operation, the number of key operations carried out by the user is cumulated. Once the counter has finished, the letter corresponding to the number of key operations carried out is selected, and the method moves to box 52. In box 52, the string of characters ending with the final character selected is displayed. In box 53, the search procedure in the list is started. In box 54, the result of the search is displayed on the screen, with the cursor placed on the first distinguishing character of the string of characters displayed. Then the operation is resumed from box 51.

The user is capable at all moments of pressing the key "delete", which triggers an interruption IT1 which renders it possible to restart the operation at box 50. Similarly, when the string of characters displayed in box 54 corresponds to the string wanted by the user, the latter presses the key "select" of the keyboard, which triggers an interruption IT2 ending the operation at box 55.

It is important to note that a single screen line is sufficient for carrying out the method according to the invention.

It is obvious that the embodiment described above is susceptible of modifications without departing from the scope of the present invention.

I claim:

1. A method of finding a desired entry in a collection of data from a telephone set which comprises data selection means, display means and a memory which stores said collection, said collection being a telephone directory, said method comprising the steps of:

searching in said collection after a character has been selected, displaying a first entry of the collection starting with the selected character or with a chain of characters ending with the selected character, placing a selection cursor on a distinguishing character of the displayed entry, changing said distinguishing character to a desired character, searching in said collection for a string of characters beginning with said desired character, and displaying said string of characters to complete said desired entry.

2. A telephone comprising selection means, display means, access means for accessing a collection of data which includes a telephone directory, and a memory which stores said collection;

said access means comprising:

search means for searching in said collection after a character has been selected, display means for displaying an entry of the collection starting with the selected character or with a chain of characters ending with the selected character, means for placing a selection cursor on a distinguishing character of the displayed entry, and means for changing said distinguishing character to a desired character, wherein said search means searches in said collection for a string of characters beginning with said desired character, and said display means displays said string of characters to complete said entry.

3. A telephone set comprising data selection means, display means, access means for accessing a collection of data which includes a telephone directory, and a memory which stores said collection;

said access means comprising:

search means for searching in said collection after a character has been selected, display means for displaying an entry of the collection starting with the selected character or with a chain of characters ending with the selected character, means for placing a selection cursor in the displayed entry on a distinguishing character of the displayed entry, and means for inputting a desired character over said distinguishing character, wherein said search means searches in said collection for a string of characters beginning with said desired character, and said display means displays said string of characters.

4. A method of finding a desired entry in a data collection from a telephone having a memory for storing said data collection which includes a telephone directory, comprising the steps of:

searching said data collection for first entries beginning with a selected character;

displaying said first entries;

changing an unwanted character of an entry included in said first entries to a desired character;

searching said data collection for second entries beginning with said desired character; and replacing a portion of said first entries with said second entries, said portion beginning from said unwanted character.

5. The method of claim 4 further comprising repeating the changing, searching and replacing steps until said desired entry is displayed.

6. A telephone configured to find a desired entry in a data collection which includes a telephone directory comprising:

a memory which stores said data collection;

searching means for searching said data collection for first entries beginning with a selected character;

display means for displaying said first entries;

change means for changing an unwanted character of an entry included in said first entries to a desired character;

said searching means searching said data collection for second entries beginning with said desired character; and replacing means for replacing a portion of said first entries with said second entries, said portion beginning from said unwanted character.

7. A telephone configured to find a desired entry in a data collection which includes a telephone directory comprising a memory which stores said data collection and a processor which is configured to perform the steps of:

searching said data collection for first entries beginning with a selected character;

a displaying said first entries;

changing an unwanted character of an entry included in said first entries to a desired character;

searching said data collection for second entries beginning with said desired character; and replacing a portion of said first entries with said second entries, said portion beginning from said unwanted character.

8. The device of claim 7 wherein said processor which is further configured to repeat the changing, searching and replacing steps until said desired entry is displayed.

* * * * *